(12) United States Patent
Shi et al.

(10) Patent No.: US 11,442,743 B2
(45) Date of Patent: Sep. 13, 2022

(54) ADAPTER FOR DEVICE CONFIGURATION AND MONITORING

(71) Applicant: Rockwell Automation Technologies, Inc., Mayfield Heights, OH (US)

(72) Inventors: Xiaofeng Shi, Shanghai (CN); Yanbin Zhang, Shanghai (CN); Chirag L. Malkan, Milwaukee, WI (US); Zhen Wei, Shanghai (CN); Vaithianathan Jothi, Milwaukee, WI (US); Benfeng Tang, Shanghai (CN); Alvaro Sanchez, Milwaukee, WI (US); Steven T. Haensgen, Milwaukee, WI (US); David D. Brandt, Milwaukee, WI (US); John Caspers, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 177 days.

(21) Appl. No.: 17/010,523

(22) Filed: Sep. 2, 2020

(65) Prior Publication Data
US 2022/0066790 A1 Mar. 3, 2022

(51) Int. Cl.
| | | |
|---|---|---|
| G06F 9/00 | (2006.01) | |
| G06F 9/445 | (2018.01) | |
| H04W 4/80 | (2018.01) | |
| H04W 76/10 | (2018.01) | |
| G06F 1/26 | (2006.01) | |
| H04L 41/00 | (2022.01) | |
| G06F 9/4401 | (2018.01) | |

(52) U.S. Cl.
CPC ............ *G06F 9/44505* (2013.01); *G06F 1/26* (2013.01); *H04L 41/24* (2013.01); *H04W 4/80* (2018.02); *H04W 76/10* (2018.02); *G06F 9/4401* (2013.01)

(58) Field of Classification Search
CPC ....... G06F 9/44505; G06F 1/26; H04L 41/24; H04L 12/4625; H04W 4/80; H04W 76/10; H04W 12/50; H04W 12/47; G05B 2219/31093
USPC .......................................................... 713/1
See application file for complete search history.

(56) References Cited

U.S. PATENT DOCUMENTS

| | | | | |
|---|---|---|---|---|
| 2002/0142765 A1* | 10/2002 | Rhoads | ................. | H04L 67/306 455/420 |
| 2004/0153765 A1* | 8/2004 | Prifling | ............. | H04L 29/08846 714/18 |
| 2005/0195537 A1* | 9/2005 | Virolainen | ......... | G05B 19/0426 361/18 |
| 2006/0007910 A1* | 1/2006 | Scheibli | .............. | H04L 61/2015 370/351 |
| 2007/0168464 A1* | 7/2007 | Noonan | ................. | G16H 10/60 709/218 |
| 2014/0074261 A1* | 3/2014 | Wang | ........................ | G06F 1/00 700/90 |
| 2015/0121207 A1* | 4/2015 | Shuler | ................... | G06F 40/109 715/256 |
| 2015/0156071 A1* | 6/2015 | Adolphson | ............. | H04L 45/02 370/254 |

(Continued)

*Primary Examiner* — Volvick Derose
(74) *Attorney, Agent, or Firm* — Scott D. Thorpe

(57) ABSTRACT

For device configuration and monitoring, a processor receives configuration settings from an electronic device via the electronic device interface. The processor converts the configuration settings to hardware settings for a target device. The processor communicates the hardware settings to the target device via a target device interface.

20 Claims, 16 Drawing Sheets

(56) References Cited

U.S. PATENT DOCUMENTS

| | | | |
|---|---|---|---|
| 2017/0195827 A1* | 7/2017 | Vasko | H04W 4/80 |
| 2017/0364467 A1* | 12/2017 | Zhai | G11B 33/126 |
| 2018/0331895 A1* | 11/2018 | Tang | H04L 67/1097 |
| 2020/0252276 A1* | 8/2020 | Lairsey | H04L 41/0813 |
| 2020/0396176 A1* | 12/2020 | Lochhead | H04L 12/4641 |
| 2020/0396179 A1* | 12/2020 | Lochhead | H04L 45/58 |
| 2020/0396181 A1* | 12/2020 | Lochhead | H04L 49/20 |
| 2022/0038343 A1* | 2/2022 | Dompe | H04L 67/38 |

* cited by examiner

ADAPTER FOR DEVICE CONFIGURATION AND MONITORING

BACKGROUND INFORMATION

The subject matter disclosed herein relates to an adapter for device configuration and monitoring.

BRIEF DESCRIPTION

An adapter for device configuration and monitoring is disclosed. The adapter includes an electronic device interface that communicates with an electronic device. The adapter further includes a target device interface that communicates with a target device disposed in an automation equipment cabinet. The adapter includes a processor and a memory that stores code executable by the processor. The processor receives configuration settings from the electronic device via the electronic device interface. The processor converts the configuration settings to hardware settings for the target device. The processor communicates the hardware settings to the target device via the target device interface.

A system for device configuration and monitoring is also disclosed. The system includes a target system comprising a plurality of target devices. The system includes a gateway device disposed in an automation equipment cabinet and that communicates with the plurality of target devices. The system includes an electronic device that executes a configuration application. The system includes an adapter that receives configuration settings from the electronic device. The adapter further converts their configuration settings to hardware settings for each of the plurality of target devices. The adapter communicates the hardware settings to the plurality of target devices of the target system via the gateway device.

A method for device configuration and monitoring is disclosed. The method receives configuration settings via an electronic device interface from a configuration application of an electronic device. The method converts the configuration settings to hardware settings for a target device disposed in an automation equipment cabinet. The method communicates the hardware settings via a target device interface to the target device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
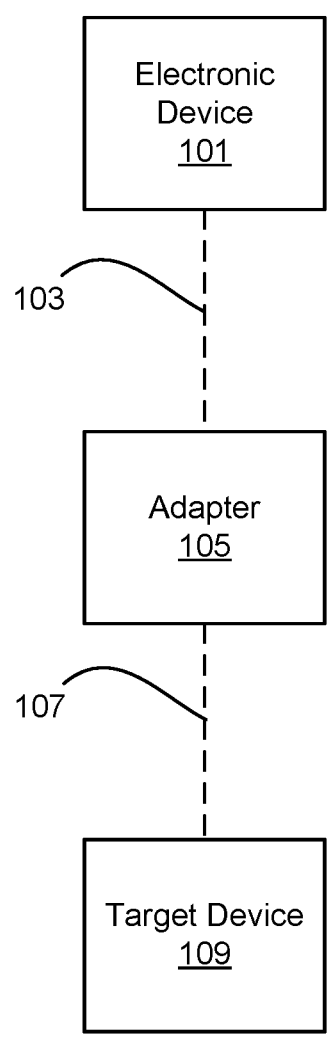
FIG. 1A is a schematic block diagram of a configuration and monitoring system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a configuration and monitoring system 100. The system 100 may configure and monitor a target device 109. The target device 109 may be industrial equipment, a controller, and the like. In one embodiment, the target device 109 is a motor controller, a tower light, a signal conditioner, and the like. The target device 109 may not communicate with a network. In addition, the target device 109 may not have a connection to a network.

In the depicted embodiment, the system 100 includes an electronic device 101, an adapter 105, and the target device 109. The electronic device 101 may communicate with the adapter 105 via a first communication channel 103. The first communication channel 103 may be selected from the group consisting of a BLUETOOTH® channel as defined by the Bluetooth Special Interest Group and a wired channel. The adapter 105 may communicate with the target device 105 via a second communication channel 107. In one embodiment, the second communication channel 107 is a Near Field Communication (NFC) channel.

The first communication channel 103 and/or second communication channel 107 may be a WiFi network based on any one of the Institute of Electrical and Electronics Engineers (IEEE) 802.11 standards. In addition the first communication channel 103 and/or second communication channel 107 may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the first communication channel 103 and/or second communication channel 107 may employ a ZigBee connection based on the IEEE 802 standard. In one embodiment, the first communication channel 103 and/or second communication channel 107 employs a Z-Wave connection as designed by Sigma Designs. Alternatively, the first communication channel 103 and/or second communication channel 107 may employ an ANT and/or ANT+ connection as defined by Dynastream Innovations Inc. of Cochrane, Canada.

The first communication channel 103 and/or second communication channel 107 may be an infrared connection including connections conforming at least to the Infrared Physical Layer Specification (IrPHY) as defined by the Infrared Data Association (IrDA). Alternatively, the first communication channel 103 and/or second communication channel 107 may be a cellular telephone network communication. All standards and/or connection types include the latest version and revision of the standard and/or connection type as of the filing date of this application.

The target device 109 may need to be configured in order to operate properly. In the past, the configuration has been performed with manual controls such as buttons, switches, and knobs. Unfortunately, manual controls increase the size and cost of the target device 109. In addition, manual controls require significant user expertise in order to properly configure the target device 109. It also may be useful to monitor data from the target device 109. Unfortunately, data cannot be monitored without a physical connection to the target device 109.

The embodiments described herein provide an adapter 105 that interfaces with the target device 109 and with the electronic device 101. The electronic device 101 may configure the target device 109 via the adapter 105. As a result, the target device 109 does not require the manual controls, reducing the cost of the target device 109. Instead, the target device 109 may be configured using a configuration application that executes on the electronic device 101. The configuration application may simplify and enhance the configuration of the target device 109. In addition, the electronic device 101 may monitor data from the target device 109 via the adapter 105. Thus, the target device 109 may be efficiently and effectively configured and monitored without a direct connection to a network.

Figure 1B:
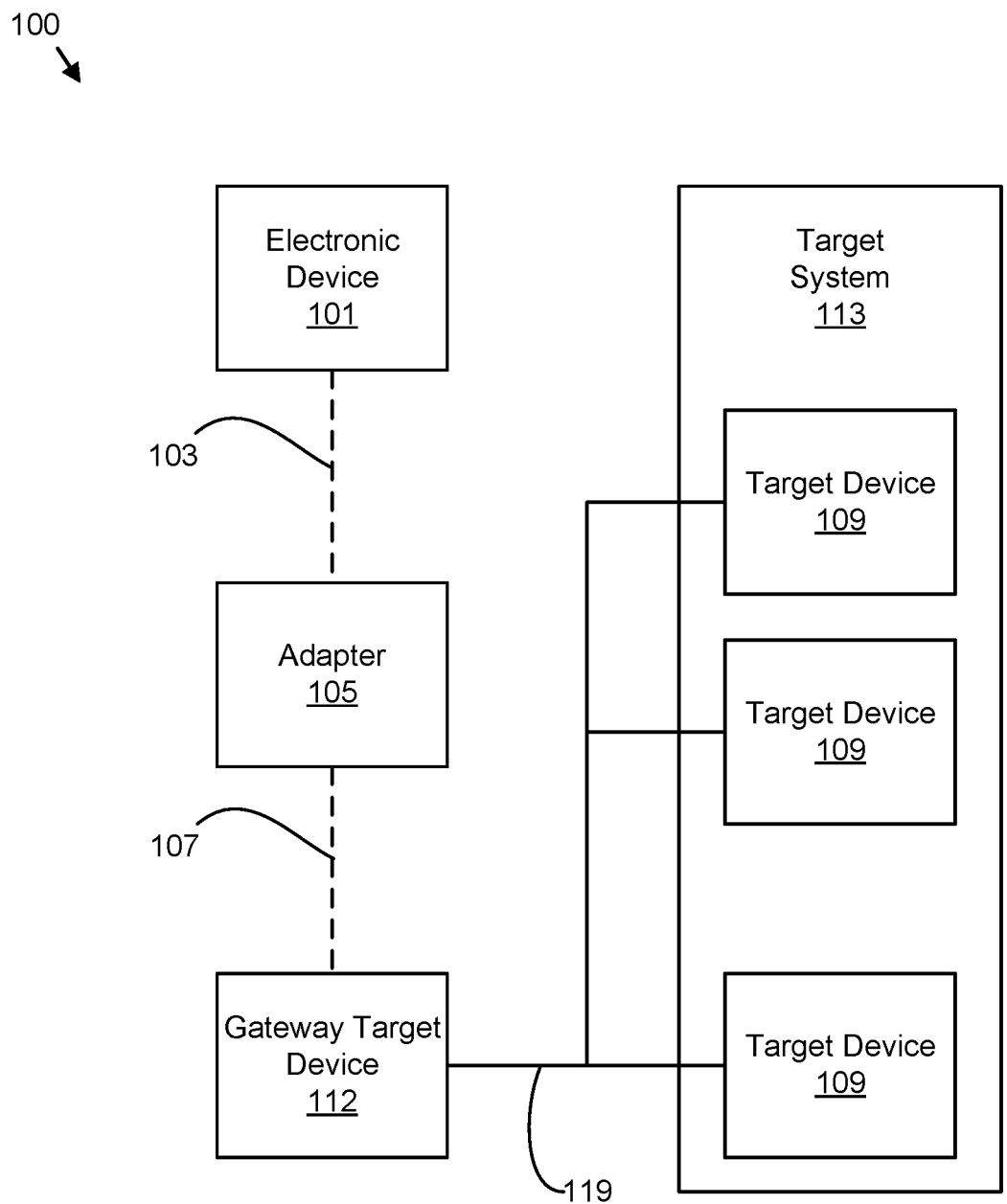
FIG. 1B is a schematic block diagram of a configuration monitoring system according to an alternate embodiment.

FIG. 1B is a schematic block diagram of a configuration monitoring system 100. In the depicted embodiment, the adapter 105 communicates with a gateway device 112 that provides access to the target devices 109 of a target system 113. The gateway device 112 communicates with the target system 113. The target system 113 may include a plurality of target devices 109a. The target devices 109a may be disposed in one or more device racks. The gateway device 112 may communicate with the target system 113 via a third communication channel 119. In one embodiment, the third communication channel 119 is a wired connection. In addition, the third communication channel 119 may be a wireless connection.

The adapter 105 may communicate hardware settings for each of the plurality of target devices 109a. The target devices 109a may be configured using the configuration application that executes on the electronic device 101. In addition, the electronic device 101 may monitor data from the target devices 109a via the adapter 105. Thus, the target devices 109a may be efficiently and effectively configured and monitored without a direct connection to a network.

Figure 1C:
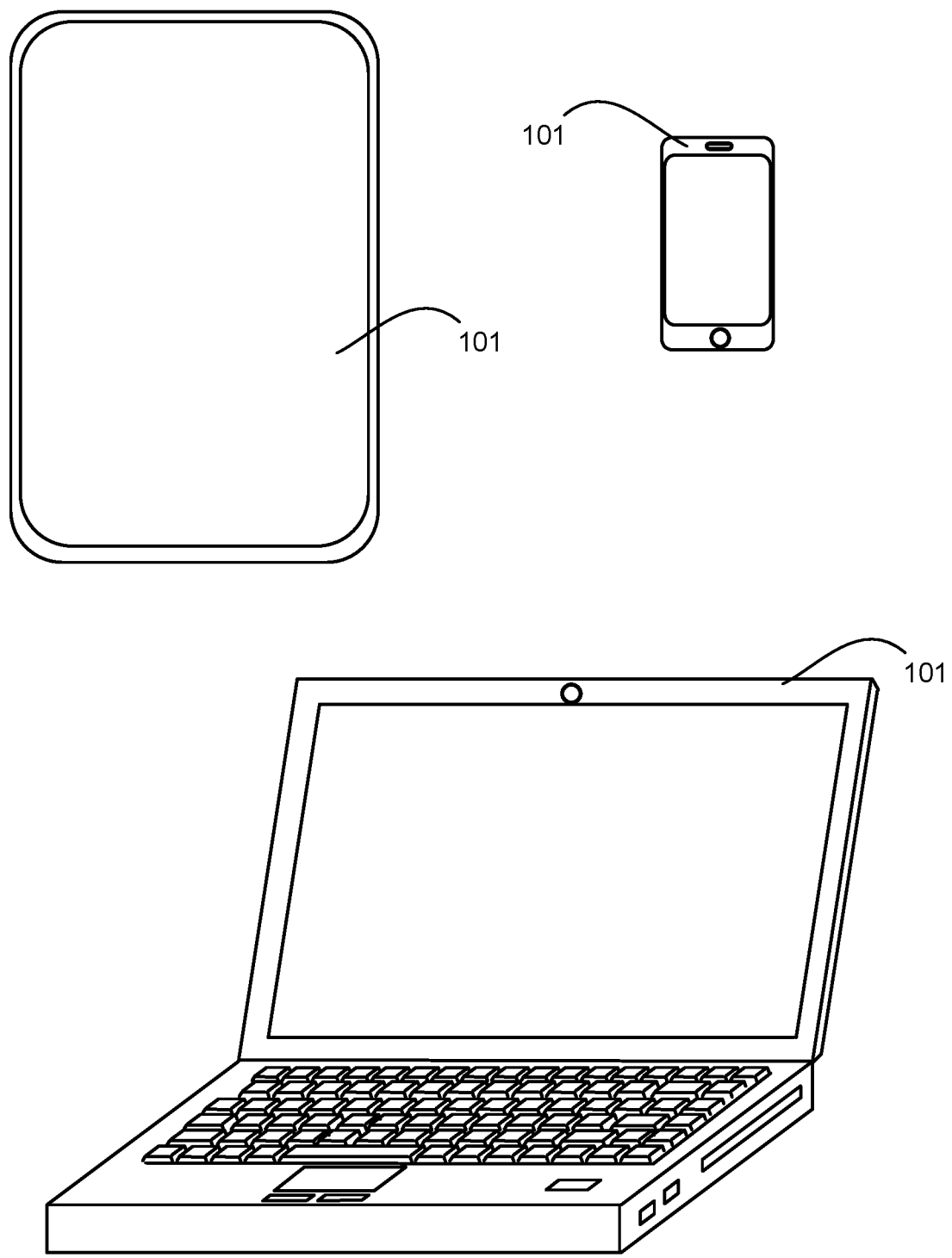
FIG. 1C is a front view drawing of electronic devices according to an embodiment.

FIG. 1C is a front view drawing of electronic devices 101. In the depicted embodiment, the electronic devices 101 are shown as a tablet computer electronic device 101, a mobile telephone electronic device 101, and a laptop computer electronic device 101. Other types of electronic devices 101 may be employed.

Figure 1D:
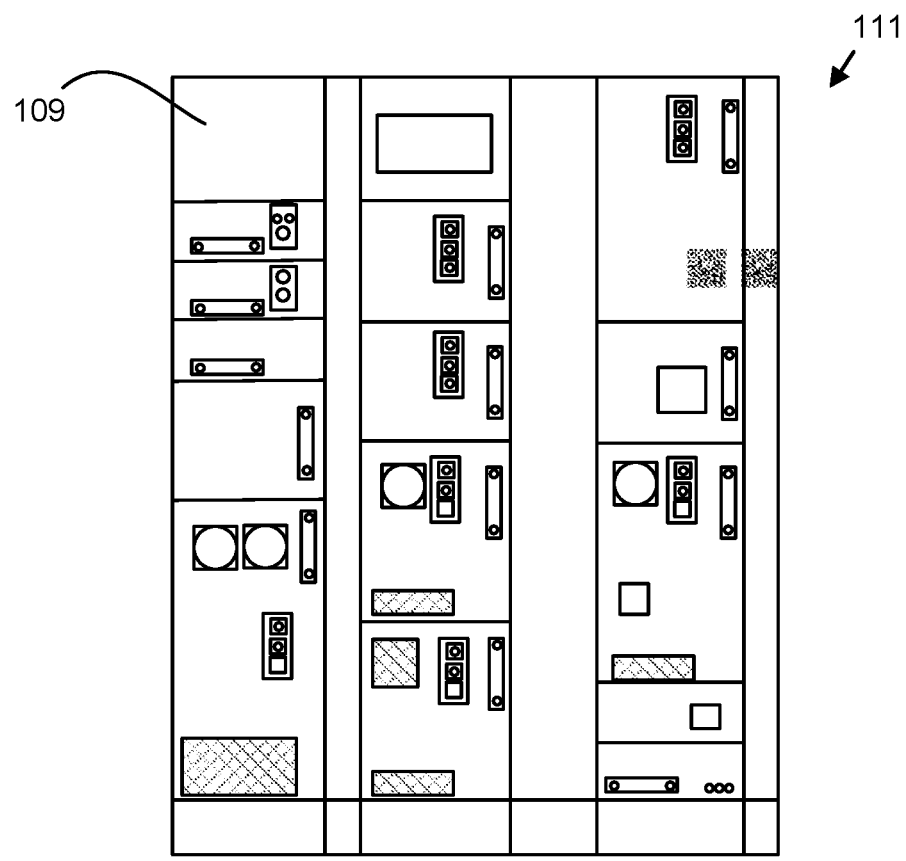
FIG. 1D is a front view drawing of a device rack according to an embodiment.

FIG. 1D is a front view drawing of a device rack 111. In the depicted embodiment, a target device 109 is disposed in the device rack 111. In one embodiment, a plurality of target devices 109 are disposed in the device rack 111.

Figure 1E:
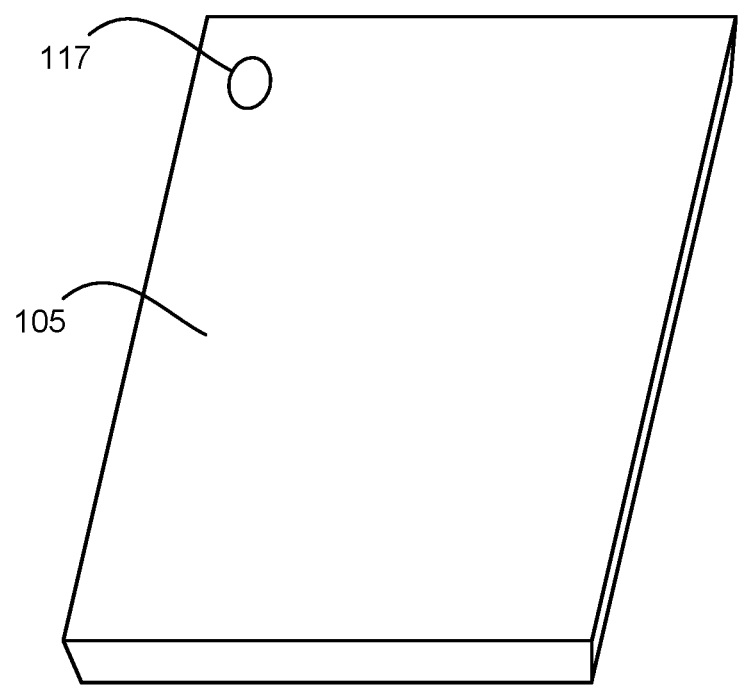
FIG. 1E is a perspective drawing of an adapter according to an embodiment.

FIG. 1E is a perspective drawing of the adapter 105. In the depicted embodiment, the adapter 105 includes an indicator 117. The indicator 117 may comprise a plurality of Light Emitting Diodes (LED). Other types of indicators 117 may be employed. The indicator 117 indicates an adapter status of the adapter 105 as will be described hereafter.

The adapter 105 may be attached to the outside of a target device 109. The adapter may also be attached to a device rack 111. The adapter 105 may be disposed in a closed target device 109. In addition, the adapter 105 may be disposed in the device rack 111. As a result, the adapter 105 is protected from damage.

Figure 2:
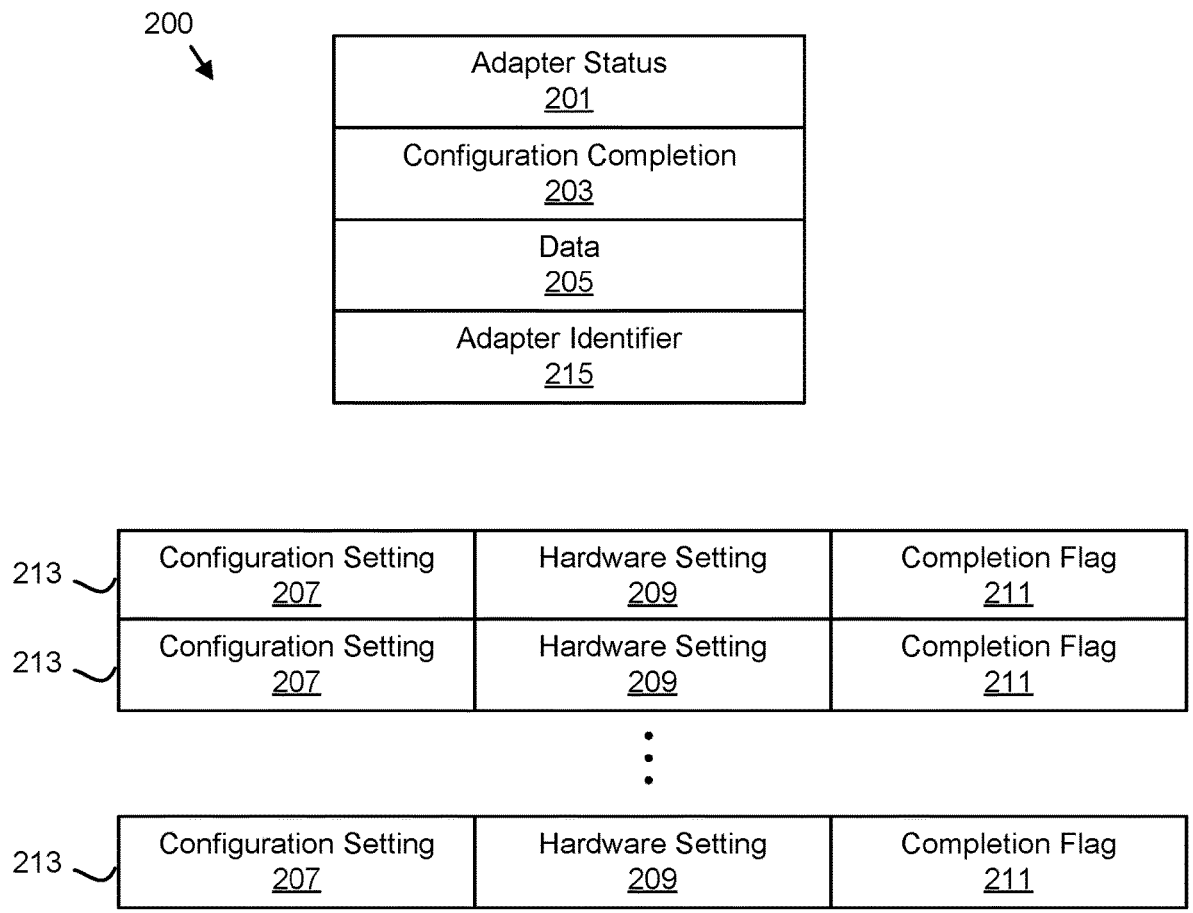
FIG. 2 is a schematic block diagram of adapter data according to an embodiment.

FIG. 2 is a schematic block diagram of adapter data 200. The adapter data 200 may facilitate the configuration and the monitoring of the target device 109. The adapter data 200 may be organized as a data structure in a memory. In the depicted embodiment, the adapter data 200 includes an adapter status 201, a configuration completion 203, data 205, an adapter identifier 215, and one or more configuration entries 213.

The adapter status 201 may specify a current status of the adapter 105. The current status may be a state, a current action, a next action, a result, and the like.

The configuration completion 203 may indicate whether a configuration of the target device 109 is complete. In one embodiment, the configuration completion 203 specifies a percent completion of the configuration. In addition, the configuration completion 203 may comprise one or more log entries detailing configuration events.

The data 205 may be received from the target device 109. The target device 109 may generate the data 205. The data 205 may be communicated to the electronic device 101 and monitored by the electronic device 101 as will be described hereafter.

The adapter identifier 215 may uniquely identify the adapter 105. In one embodiment, the adapter identifier 215 validates communications between the adapter 105 and the target device 109.

Each configuration entry 213 may comprise a configuration setting 207, a hardware setting 209, and a completion flag 211. The configuration setting 207 may be received from the electronic device 101. The configuration setting 207 may specify a setting for a target device 109. The adapter 105 may convert the configuration settings 207 to hardware settings 209 for the target device 109. The hardware settings 209 may specify the setting in a format for implementation on the target device 109. The adapter 105 may further communicate the hardware settings 209 to the target device 109. The target device 109 is configured with the hardware settings 209.

The hardware settings 209 may include a register address. The register address may identify a configuration register as will be described hereafter. In addition, the register address may identify a target device 109a.

In response to the target device 109 being configured with a given hardware setting 209, the adapter 105 may assert the completion flag 211. The completion flag 211 may be asserted in response to communicating the corresponding hardware setting 209 to the target device 109. In addition, the completion flag 211 may be asserted in response to receiving an acknowledgment from the target device 109 that the target device 109 is configured with the corresponding hardware setting 209.

Figure 3:
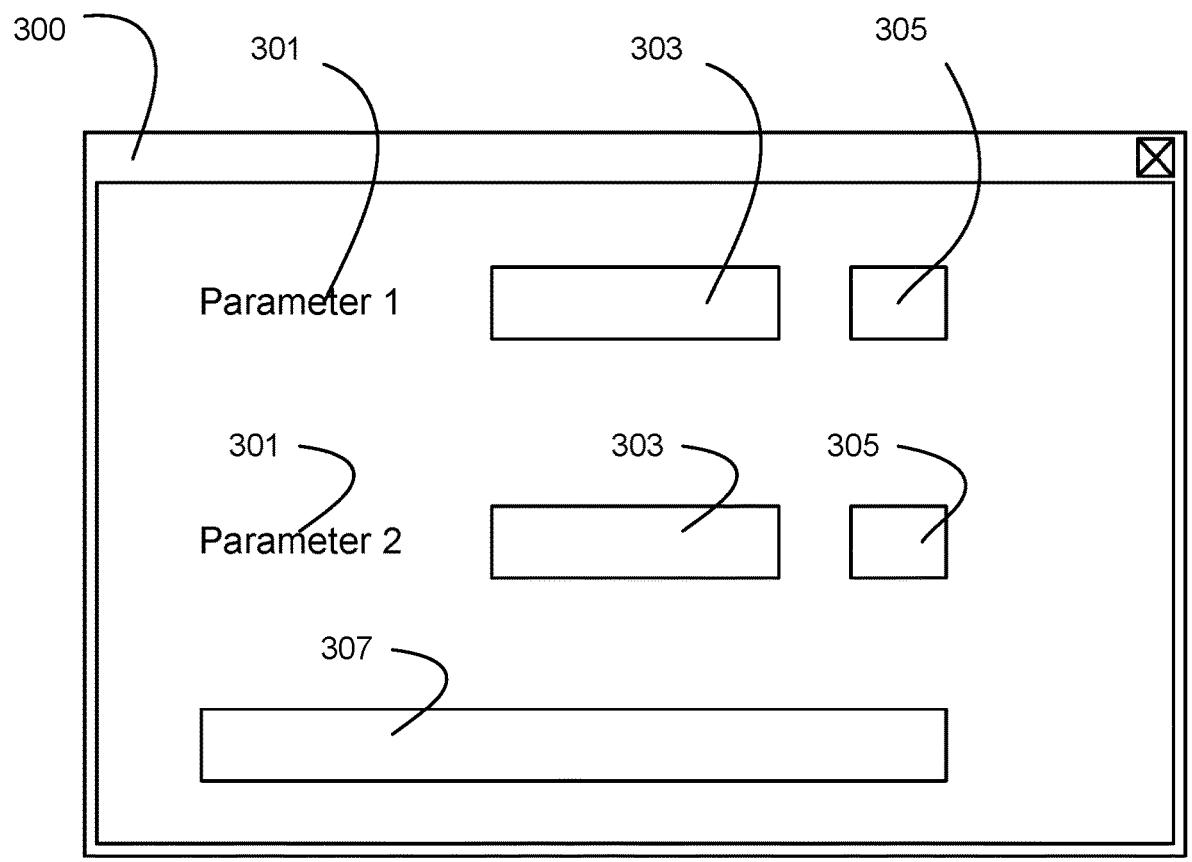
FIG. 3 is drawing illustrating the configuration application according to an embodiment.

FIG. 3 is drawing illustrating the configuration application 300. In the depicted embodiment, the configuration application 300 is shown as a window that is presented by the electronic device 101. The configuration application 300 may be executed and/or presented by the electronic device 101.

In the depicted embodiment, the configuration application 300 displays one or more parameters 301 and receives one or more corresponding configuration values 303. For example, parameter 1 301 may be a maximum motor speed parameter 301. A user may select and/or enter a corresponding configuration value 303 of 1800 Rotations Per Minute (RPM). A completion field 305 may display the completion flag 211 and/or the configuration completion 203 for the corresponding parameter 301 and/or for a plurality of parameters 301.

In one embodiment, a data field 307 presents data 205 received from the electronic device 101. The data 205 may be presented as alphanumeric data, graphical data, a table, and the like.

Figure 4A:
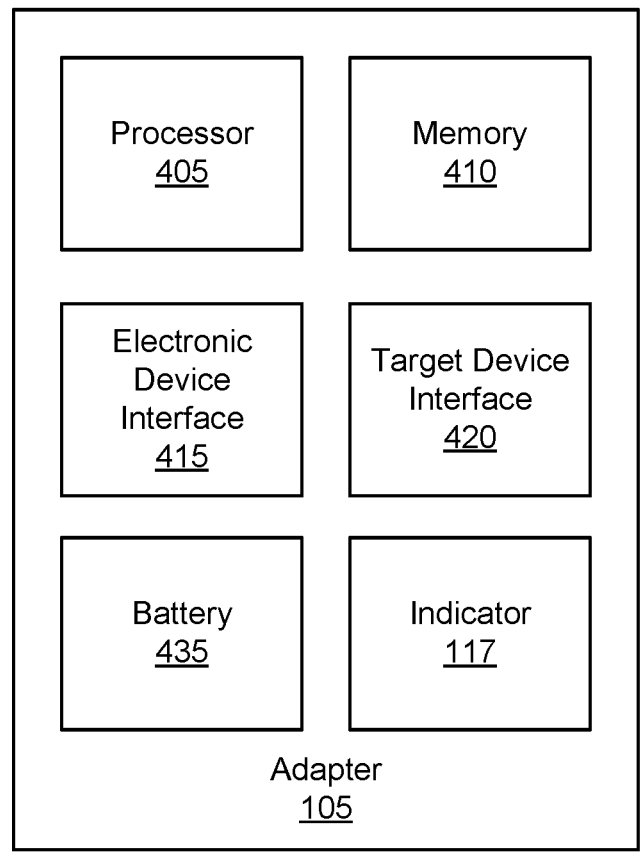
FIG. 4A is a schematic block diagram of an adapter according to an embodiment.

FIG. 4A is a schematic block diagram of the adapter 105. In the depicted embodiment, the adapter 105 includes a processor 405, a memory 410, electronic device interface 415, a target device interface 420, and the indicator 417. In addition, the adapter 105 may include a battery 435. The processor 405, memory 410, electronic device interface 415, and target device interface 420 may be organized as one or more components.

The memory 410 may be a semiconductor storage device. In addition, the memory 410 may include a hard disk drive, an optical storage device, and/or a micromechanical storage device. The memory 410 may store code. The processor 405 may execute the code. The electronic device interface 415 may support a BLUETOOTH® connection. In addition, electronic device interface 415 may support a WiFi connection. The electronic device interface 415 may support an RFID connection. In one embodiment, the electronic device interface 415 supports a ZigBee connection. The electronic device interface 415 may support an ANT and/or ANT+ connection. In a certain embodiment, the electronic device interface 415 supports an IrPHY connection.

The target device interface 420 may support an NFC connection. In addition, the target device interface 420 may support a BLUETOOTH® connection, a WiFi connection, an RFID connection, a ZigBee connection, an ANT and/or ANT+ connection, and/or an IrPHY connection.

The battery 435 may power the adapter 105. In addition, the battery 435 may power the processor 405, the memory 410, the electronic device interface 415, and/or the target device interface 420. It is certain embodiment, the battery 435 powers a portion of the target device 109. For example, the battery 435 may power an adapter interface of the target device 109, and/or a configuration module of the target device 109 via the target device interface 420. The adapter interface and the configuration module will be described hereafter.

In one embodiment, the adapter 105 is powered by a power supply. The power supply may further power portions of the target device 109 via the target device interface 420.

The processor 405 may control the indicator 117. The indicator 117 may be powered by the battery 435 and/or the power supply.

Figure 4B:
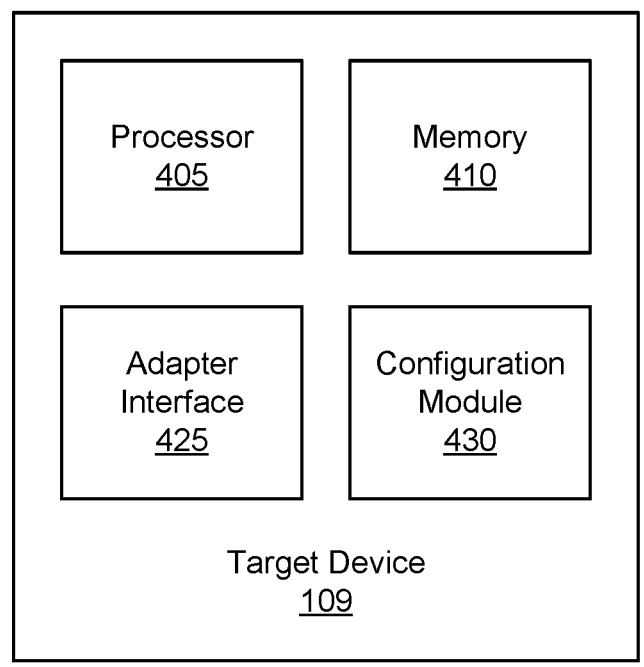
FIG. 4B is a schematic block diagram of a target device according to an embodiment.

FIG. 4B is a schematic block diagram of the target device 109. In the depicted embodiment, the target device includes a processor 405, a memory 410, the adapter interface 425, and the configuration module 430. In a certain embodiment, the processor 405 and/or memory 410 are embodied in the adapter interface 425. The memory 410 may store code. The processor 405 may execute the code. The processor 405, memory 410, adapter interface 425, and/or configuration module 430 may be organized as one or more components. The target device 109 may include other functional elements to perform a desired function.

The adapter interface 425 may communicate with the target device interface 420 of the adapter 105. The adapter interface 425 may support an NFC connection. In addition, the adapter interface 425 may support a BLUETOOTH® connection, a WiFi connection, an RFID connection, a ZigBee connection, an ANT and/or ANT+ connection, and/or an IrPHY connection.

The adapter interface 425 may further communicate with the configuration module 430. The configuration module 430 may configure the target device 109. The configuration module 430 is described in more detail in FIG. 4C.

Figure 4C:
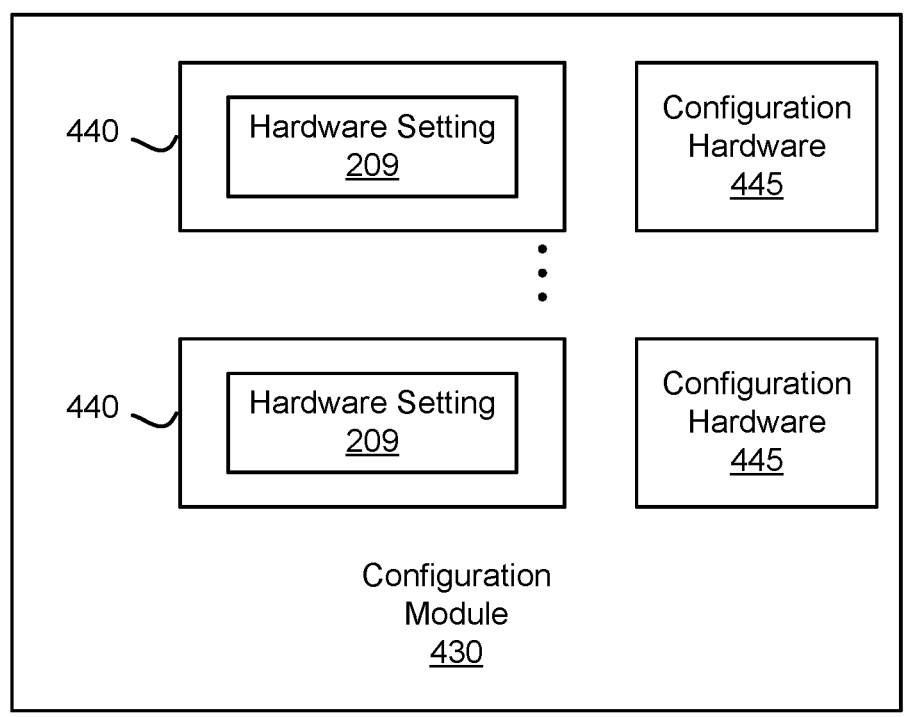
FIG. 4C is a schematic block diagram of a configuration module according to an embodiment.

FIG. 4C is a schematic block diagram of the configuration module 430. In the depicted embodiment, the configuration module 430 comprises a plurality of configuration registers 440. Each configuration register 440 may store a corresponding a hardware setting 209. Each configuration register 440 may be addressed by the register address. In one embodiment, the register address identifies the target device 109a. In a certain embodiment, the register address specifies a software value in the memory 410.

Each configuration register 440 further corresponds to configuration hardware 445. The configuration hardware 455 may be a register, a solid-state switch, a digital potentiometer, and the like. As a result, manual configuration switches and potentiometers are not needed. The configuration hardware 445 may configure the target device 109 based on the hardware setting 209 stored by the corresponding configuration register 440. For example, a hardware setting 209 may specify closing a solid-state switch of the configuration hardware 445. In addition, a hardware setting 209 may specify a digital potentiometer setting for a potentiometer of the configuration hardware 445.

Figure 4D:
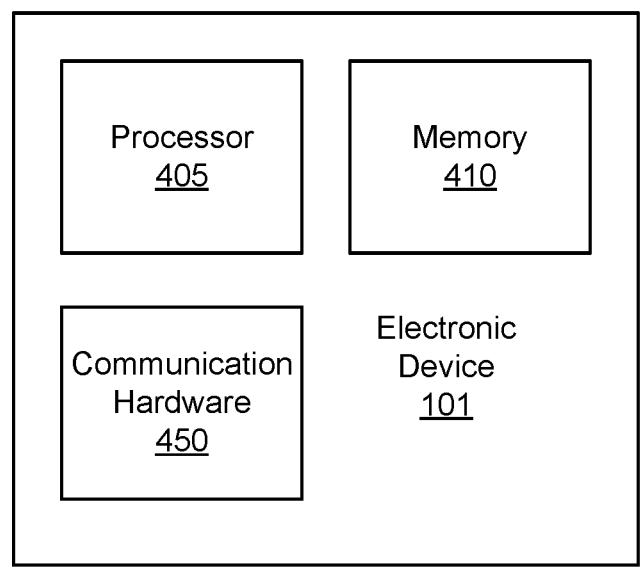
FIG. 4D is a schematic block diagram of an electronic device according to an embodiment.

FIG. 4D is a schematic block diagram of the electronic device 101. In the depicted embodiment, the electronic device 101 includes a processor 405, a memory 410, and communication hardware 450. The memory 410 stores code executable by the processor 405. The communication hardware 450 may communicate with electronic device interface 415 of the adapter 105. In one embodiment, the communication hardware 450 communicates with a network.

Figure 5A:
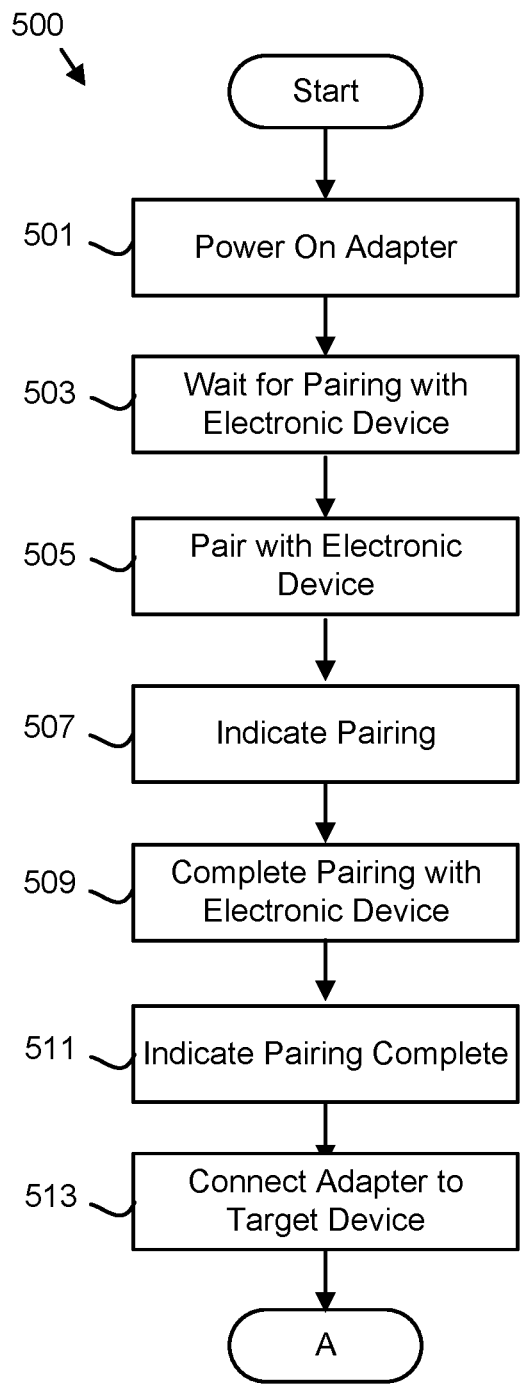
FIGS. 5A-B are schematic flow chart diagrams of a configuration method according to an embodiment.
Figure 5B:
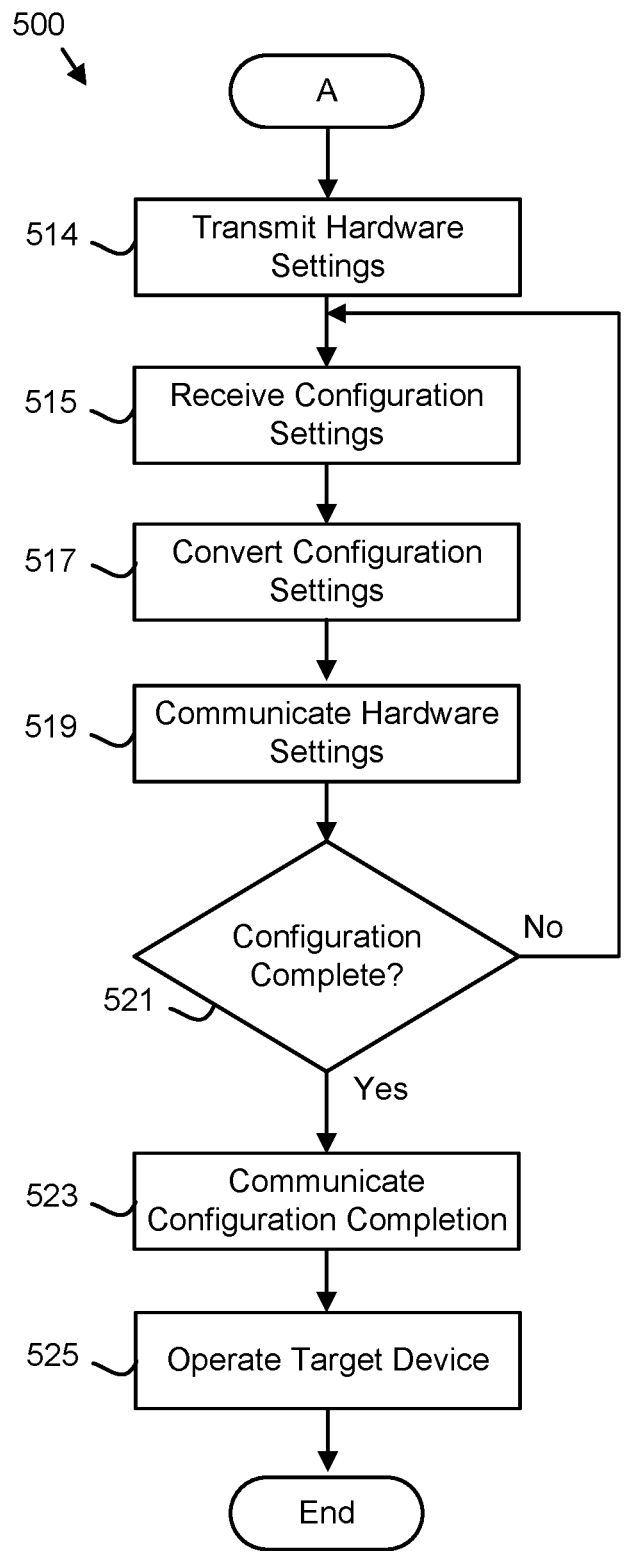

FIGS. 5A-B are a schematic flow chart diagram of a configuration method 500. The method 500 may connect the adapter 105 to the electronic device 101 and/or the target device 109. In addition, the method 500 may configure the target device 109. The method 500 may be performed by the adapter 105 and/or the processor 405.

The method 500 starts, and in one embodiment, the adapter 105 is powered on 501. The adapter 105 may be powered on by a switch and/or in response to the insertion of the battery 435.

The processor 405 may wait 503 for pairing with the electronic device 101. The processor 405 may wait 503 for a tap pairing with the electronic device 101. For example, the processor 405 may wait 503 for a specified acceleration concurrent with the communication via the first communication channel 103.

In one embodiment, the adapter 105 attempts to pair with the electronic device 101 using Out-Of-Band (OOB) pairing. For example, if the first communication channel 103 is a BLUETOOTH® channel, the electronic device interface 415 of the adapter 105 may attempt to communicate with the electronic device 101 via an NFC channel. In one embodiment, the NFC channel may provide a parameter for the OOB pairing.

In one embodiment, the processor 405 waits 503 for a wired connection first communication channel 103 with the electronic device 101. For example, the processor 405 may wait 503 until a wired connection is detected.

The processor 405 may further pair 507 with the electronic device 101. As used herein, pair refers to establishing a wireless connection. In one embodiment, the processor 405 establishes the first communication channel 103 with the electronic device 101. The first communication channel 103 may be established via the electronic device interface 415. For example, the electronic device interface 415 may establish a BLUETOOTH® connection with the electronic device 101. In addition, the electronic device interface 415 may establish a wired connection with the electronic device 101.

In one embodiment, the processor 405 indicates 507 the pairing. The processor 405 may indicate 507 the pairing via the electronic device interface 415. In addition, the processor 405 may indicate 507 the pairing by flashing the indicator 117. The processor 405 may further complete 509 the pairing with the electronic device 101.

The processor 405 may indicate 511 that the pairing is complete. The processor 405 may communicate an indication via the first communication channel 103 that the pairing is complete. In addition, the processor 405 may cause the indicator 117 to display a solid light to indicate that the pairing is complete.

The processor 405 may further connect 513 the adapter 105 to the target device 109. In one embodiment, the processor 405 connects 513 the target device interface 420 to the adapter interface 425. In a certain embodiment, the processor 405 directs the target device interface 420 to connect 513 to the adapter interface 425. The target device interface 420 may pair with the adapter interface 425.

In one embodiment, the adapter 105 connects 513 to the target device 109 in response to the adapter 105 been placed near to the target device 109. For example, the adapter 105 may be placed within or next to a housing of the target device 109. The adapter 105 may connect 513 to the target device 109 in response to being placed in proximity to the target device 109.

The processor 405 may transmit 514 the hardware settings 209 for the target device 109 from the target device 109 to the electronic device 101. For example, the processor 405 may read the hardware settings 209 from the configuration registers 440 via the second communication channel 107 and communicate the hardware settings 209 to the electronic device 101 via the first communication channel 103.

The processor 405 may receive 515 the configuration settings 207 from the electronic device 101. The configuration settings 207 may be received 515 via the electronic device interface 415. In one embodiment, the configuration settings 207 are stored in the memory 410.

The processor 405 may convert 517 the configuration settings 207 to the hardware settings 209 for the target device 109. The configuration settings 207 may be converted to a standard format for hardware settings 209. The standard format may specify a register address of configuration hardware 445 for each hardware setting 209. In a certain embodiment, the register address specifies a target device 109a. For example, a gateway device 112 may receive a hardware setting 209 and route the hardware setting 209 to a target device 109a based on the register address.

In one embodiment, the standard format includes a checksum. The checksum may be used to validate the hardware settings 209 at the target device 109.

The standard format may also include a security credential. The security credential may validate the hardware settings 209 to the target device 109. In one embodiment, the standard format includes the adapter identifier 215. The adapter identifier 215 may identify the adapter 105 to the target device 109. In one embodiment, the adapter identifier 215 validates communications from the adapter 105 to the target device 109.

The processor 405 may communicate 519 the hardware settings 209 to the target device 109. In one embodiment, the target device interface 420 communicates the hardware settings 209 via the adapter interface 425.

The processor 405 may determine 521 whether the configuration of the target device 109 is complete. In one embodiment, the configuration completion 203 indicates that the configuration of the target device 109 is complete if each completion flag 211 is asserted. A completion flag 211 may be asserted in response to communicating the corresponding hardware setting 209 to the target device 109. In one embodiment, a completion flag 211 is asserted in response to receiving an acknowledgment from the target device 109 that the corresponding hardware setting 209 was received by the target device 109. In a certain embodiment, the configuration completion 203 indicates the percentage of completion flags 211 that are asserted.

If the configuration of the target device 109 is not complete, the processor 405 continues to receive 515 configuration settings 207. If the configuration of the target device 109 is complete, the processor 405 communicates 523 the configuration completion 203 to the electronic device 101. In one embodiment, the processor 405 communicates 523 each completion flag 211 to the electronic device 101.

In one embodiment, the target device 109 is operated 525 based on the hardware settings 209 the method 500 ends. For example, a motor controller target device 109 may operate 525 using the hardware settings 209.

Figure 5C:
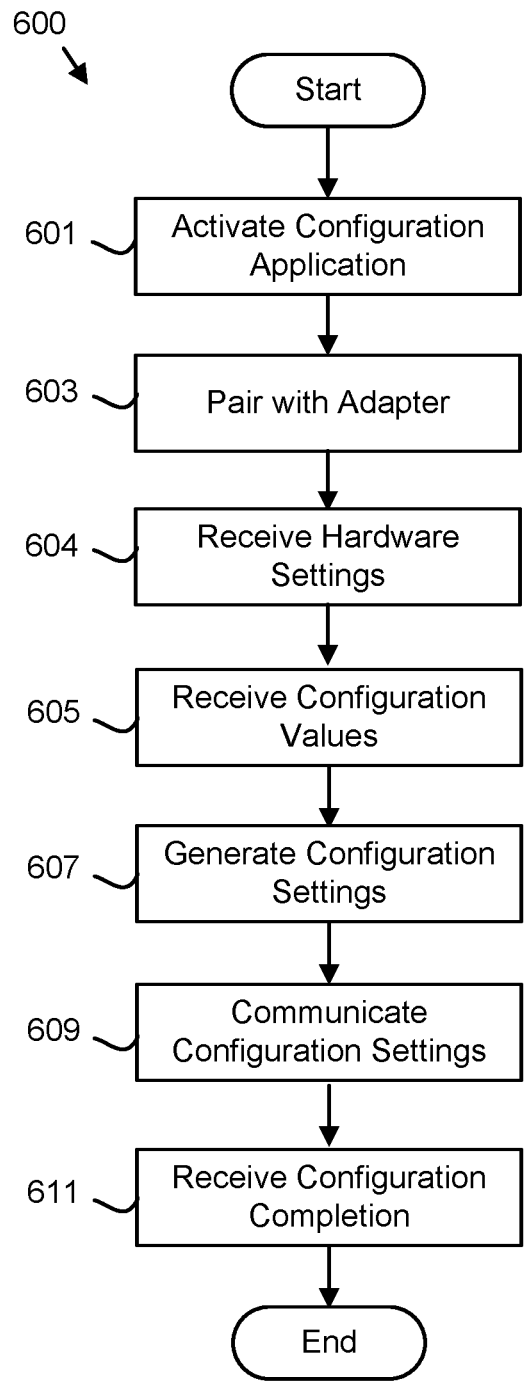
FIG. 5C is a schematic flow chart diagram of an electronic device configuration method according to an embodiment.

FIG. 5C is a schematic flow chart diagram of an electronic device configuration method 600. The method 600 may communicate configuration settings 207 to the adapter 105 and further configure the target device 109. The method 600 may be performed by the electronic device 101 and/or a processor 405 of the electronic device 101.

The method 600 starts, and in one embodiment, the processor 405 activates 601 the configuration application 300. The processor 405 may further pair 603 with the adapter 105. In one embodiment, the processor 405 performs a tap pair, pairing 603 with the adapter 105 in response to a pairing request concurrent with an acceleration. In an alternative embodiment, the processor 405 pair 603 with the adapter 105 via a wired connection.

In one embodiment, the processor 405 receives 604 current hardware settings 209 for the target device 109. The current hardware settings 209 may be transmitted to the electronic device 101 via the adapter 105.

The processor 405 may receive 605 the configuration values 303 from the configuration application 300. In one embodiment, the user inputs the configuration values 303 into the configuration application 300. In addition, the configuration application 300 may suggest configuration values 303. In a certain embodiment, the configuration application 300 suggests configuration values 303 based on data 205 received from the target device 109.

The processor 405 may generate 607 the configuration settings 207 from the configuration values 303. The configuration settings 207 may be based in part on the current hardware settings 209. In one embodiment, the configuration settings 207 are generated 607 in an adapter format for communication to the adapter 105. The adapter format may identify configuration hardware 445 for each configuration setting 207.

The processor 405 may communicate 609 the configuration settings 207 to the adapter 105. In one embodiment, the communication hardware 450 communicates 609 the configuration settings 207 to the electronic device interface 415.

The processor 405 may receive 611 the configuration completion 203 from the adapter 105 and the method 600 ends. In one embodiment, a plurality of completion flags 211 is received 611 from the adapter 105. The processor 405 may display the configuration completion 203 and/or the completion flags 211 in the completion field 305.

Figure 5D:
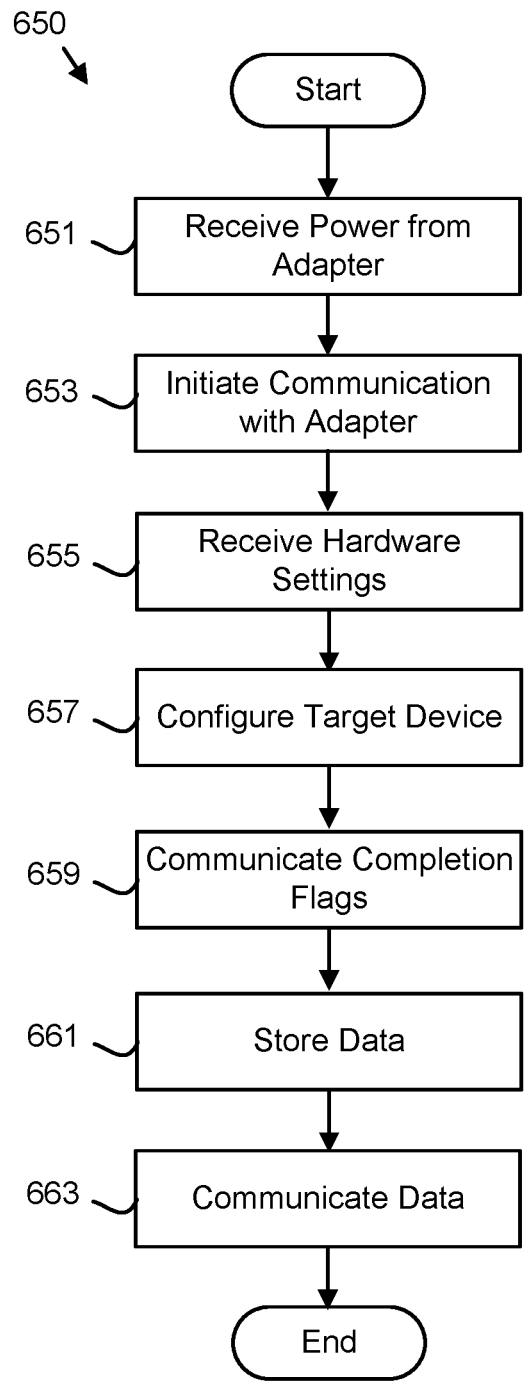
FIG. 5D is a schematic flow chart diagram of a target device configuration method according to an embodiment.

FIG. 5D is a schematic flow chart diagram of a target device configuration method 650. The method 650 may configure the target device 109 with the hardware settings 209 received from the adapter 105. The method 650 may be performed by the target device 109 and/or the processor 405 of the target device 109. The method 650 starts, and in one embodiment, the processor 405 receives 651 power from the adapter 105. The power may be received 651 through the adapter interfaced 425. In one embodiment, the power is supplied to the processor 405, the memory 410, the adapter interfaced 425, and/or the configuration module 430.

The processor 405 may initiate 653 communication with the adapter 105. In one embodiment, the processor 405 and/or adapter interfaced 425 establishes the second communication channel 107 with the adapter 105. The second communication channel 107 may be an NFC communication channel. In a certain embodiment, the second communication channel 107 is established in response to recognizing the adapter identifier 215.

The processor 405 may receive 655 the hardware settings 209 from the adapter 105. The hardware settings 209 may be stored in the configuration registers 440. The register address of the hardware settings 209 may specify the configuration register 440 that receives the hardware settings 209. In addition, the hardware settings 209 may be stored in the memory 410 of the target device 109.

In one embodiment, the processor 405 of the gateway device 112 receives 655 the hardware settings 209 for a target device 109a. The hardware settings 209 may specify the register address for a configuration register 440 at a target device 109a. The processor 405 of the gateway device 112 may communicate the hardware settings 209 to the target device 109a which receives 655 the hardware settings 209.

The processor 405 may configure 657 the target device 109 using the hardware settings 209. In one embodiment, the configuration hardware 445 is modified based on the hardware settings 209. For example, registers, solid state switches, digital potentiometers, and the like may be modified based on the hardware settings 209.

The processor 405 may communicate 659 an asserted completion flag 211 to the adapter 105 in response to each hardware setting 209 that is received 655. In one embodiment, the processor 405 communicates 659 an asserted completion flag 211 to the adapter 105 in response to each configuration hardware 445 that is successfully modified based on the hardware settings 209. In a certain embodiment, the processor 405 communicates a deasserted completion flag 211 to the adapter 105 in response to each configuration hardware 455 that is not successfully modified based on the hardware settings 209.

In one embodiment, the processor 405 stores 661 the data 205 in the memory 410 of the target device 109. The data 205 may be generated by the target device 109. The memory 410 of the target device 109 may support greater than 1 million write cycles. The processor 405 may communicate 663 the data 205 to the adapter 105 and the method 650 ends.

Figure 5E:
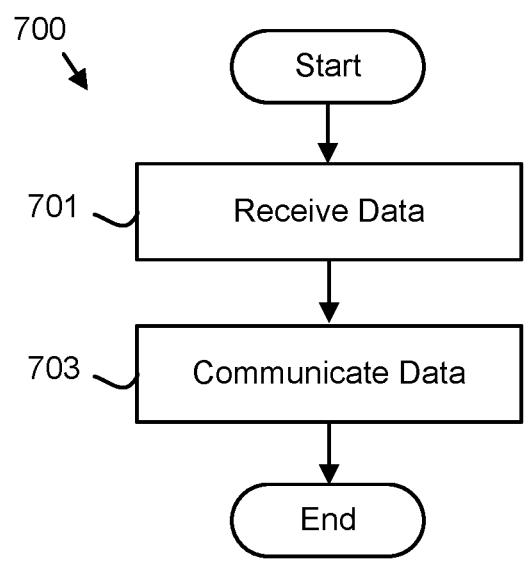
FIG. 5E is a schematic flow chart diagram of a data transfer method according to an embodiment.

FIG. 5E is a schematic flow chart diagram of a data transfer method 700. The method 700 may transfer data 205 from the target device 109 to the electronic device 101. The method 700 may be performed by the adapter 105 and/or the processor 405 of the adapter 105.

The processor 405 receives 701 the data 205 from the target device 109 and communicates 703 the data 205 to the electronic device 101 and the method 700 ends. As a result, the adapter 105 transfers the data 205 from the target device 109 to the electronic device 101.

Problem/Solution

Target devices 109 such as a motor controller, a tower light, a signal conditioner may need to be configured with configuration settings 207 and/or hardware settings 209. In the past, the configuration settings 207 and/or hardware settings 209 were manually applied to hardware such as switches, potentiometers, and the like embedded in the target device 109. Unfortunately, the hardware increased the cost of the target device 109. In addition, manually configuring the hardware often required expertise and/or knowledge of the target device 109. As a result, configuring target devices 109 was typically time-consuming and error prone.

The embodiments provide an adapter 105 that receives the configuration settings 207 from electronic device 101. The electronic device 101 may employ a configuration application 300 to support a user in generating the configuration settings 207. The adapter 105 converts the configuration settings 207 to hardware settings 209. The hardware settings 209 are communicated to the target device 109 and used to configure the target device 109.

The adapter 105 supports the use of the electronic device 101 and/or configuration application 300 to generate the configuration settings 207. As a result, the configuration settings 207 are more efficiently and accurately generated. The adapter 105 further converts the configuration settings 207 to a format such as a standard format that is compatible with the target device 109. As a result, the adapter 105 supports efficient and effective communication with the target device 109.

The adapter 105 further accurately communicates the hardware settings 209 to the target device 109. In addition, the adapter 105 may validate the completion of the configuration of the target device 109, further enhancing the efficiency and accuracy of configuring the target device 109.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An adapter comprising:
    an electronic device interface that communicates with an electronic device via a first channel, wherein a second channel provides a parameter, and the electronic device interface pairs the electronic device with the first channel using the parameter, and the electronic device interface indicates the pairing;
    a target device interface that communicates with a target device disposed in an automation equipment cabinet;
    a processor;
    a memory that stores code executable by the processor to perform:
    receiving configuration settings from the electronic device via the electronic device interface;
    converting the configuration settings to hardware settings for the target device; and
    communicating the hardware settings to the target device via the target device interface.

2. The adapter of claim 1, wherein the target device interface powers an adapter interface of the target device and/or a configuration module of the target device.

3. The adapter of claim 2, the adapter further comprising a battery that powers the adapter, the electronic device interface, the target device interface, the adapter interface, and/or the configuration module.

4. The adapter of claim 1, the processor further performing:
   determining a configuration completion of the target device; and
   communicating the configuration completion to the electronic device.

5. The adapter of claim 1, the processor further performing:
   receiving data from the target device; and
   communicating the data to the electronic device.

6. The adapter of claim 5, wherein the data is stored in a memory of the target device with greater than one million write cycles.

7. The adapter of claim 1, wherein the electronic device interface communicates via a first communication channel selected from the group consisting of a wireless channel and a wired channel and the target device interface communicates via a Near Field Communication (NFC) channel.

8. The adapter of claim 1, wherein the electronic device interface pairs with the electronic device using Out-of-Band (OOB) pairing.

9. The adapter of claim 1, the adapter further comprising an indicator that indicates a status of the adapter.

10. The adapter of claim 1, wherein the adapter is attached outside the target device or disposed in a closed target device.

11. The adapter of claim 1, wherein the target device is a gateway device that communicates with a target system comprising a plurality of target devices and the adapter communicates given hardware settings for each of the plurality of target devices.

12. A system comprising:
   a target system comprising a plurality of target devices;
   a gateway device disposed in an automation equipment cabinet and that communicates with the plurality of target devices;
   an electronic device that executes a configuration application;
   an adapter that comprises an electronic device interface that communicates with the electronic device via a first channel, wherein a second channel provides a parameter, and the electronic device interface pairs the electronic device with the first channel using the parameter and the electronic device interface indicates the pairing, the adapter further comprising a target device interface that communicates with the plurality of target devices, and wherein the adapter performs:
   receiving configuration settings from the electronic device;
   converting the configuration settings to hardware settings for each of the plurality of target devices; and
   communicating the hardware settings to the plurality of target devices of the target system via the gateway device.

13. The system of claim 12, wherein a target device interface of the adapter powers an adapter interface of the target device and/or a configuration module of the target device.

14. The system of claim 13, the adapter further comprising a battery that powers the adapter and/or the target device.

15. The system of claim 12, the adapter further performing:
   determining a configuration completion of the target device; and
   communicating the configuration completion to the electronic device.

16. The system of claim 12, the adapter further performing:
   receiving data from the target device; and
   communicating the data to the electronic device.

17. The system of claim 16, wherein the data is stored in a memory of the target device with greater than one million write cycles.

18. The system of claim 12, wherein the electronic device interface of the adapter communicates via a first communication channel selected from the group consisting of a wireless channel and a wired channel and a target device interface of the adapter communicates via a Near Field Communication (NFC) channel.

19. The system of claim 12, wherein an electronic device interface of the adapter pairs with the electronic device using Out-of-Band (OOB) pairing.

20. A method comprising:
   pairing an electronic device interface with an electronic device via a first channel, wherein a second channel provides a parameter, and the electronic device interface pairs the electronic device with the first channel using the parameter, and the electronic device interface indicates the pairing
   receiving, by use of a processor, configuration settings via the electronic device interface from a configuration application of the electronic device;
   converting the configuration settings to hardware settings for a target device disposed in an automation equipment cabinet; and
   communicating the hardware settings via a target device interface to the target device.

* * * * *